United States Patent [19]

Marc

[11] 4,268,238

[45] May 19, 1981

[54] FLOW MOLDING

[75] Inventor: Michel Marc, Wellesley, Mass.

[73] Assignee: Clint, Inc., Natick, Mass.

[21] Appl. No.: 88,776

[22] Filed: Oct. 29, 1979

Related U.S. Application Data

[63] Continuation-in-part of Ser. No. 886,055, Mar. 13, 1978, abandoned, which is a continuation-in-part of Ser. No. 853,127, Nov. 21, 1977, abandoned.

[51] Int. Cl.³ .................................................. B29H 5/26
[52] U.S. Cl. ............................... 425/174.8 E; 264/25; 264/26; 425/174; 425/174.8 R
[58] Field of Search .................. 264/25, 26; 425/174, 425/174.8 R, 174.8 E

[56] References Cited

U.S. PATENT DOCUMENTS

| | | | |
|---|---|---|---|
| 2,388,824 | 11/1945 | Brown | 264/26 |
| 2,401,991 | 6/1946 | Walton et al. | 425/174.8 |
| 2,423,902 | 7/1947 | Peterson | 425/174.8 |
| 2,492,000 | 12/1949 | Morris et al. | 264/26 |
| 2,922,865 | 1/1960 | Schattler et al. | 264/26 |
| 3,010,157 | 11/1961 | Cizek | 264/25 |
| 4,128,375 | 12/1978 | Schubart | 425/389 |

*Primary Examiner*—James H. Derrington
*Attorney, Agent, or Firm*—Wolf, Greenfield & Sacks

[57] ABSTRACT

A three-dimensional flow molding process and associated molding apparatus for making plastic parts or pieces utilizing a radio frequency heating field and means for applying constant pressure, along with an even temperature gradient, to the plastic part. In the process two metallic mold halves are joined clamping therebetween an imprinted diaphragm having the plastic on one side thereof between the diaphragm and one of the mold halves. In one version which may be preferred in constructing planar (two-dimensional) pieces or parts, pressure is applied directly by closing the mold halves and the diaphragm has a constant thickness therealong to provide even heating of the plastic that is being molded. In another version of the invention preferably for molding three-dimensional parts, a liquid conductor, such as mercury, or a sodium or graphite solution extends about the other side of the diaphragm in a space provided in one of the mold halves. In this version each of the mold halves is preferably provided with means for cooling. After the plastic, which may be in many different forms, is in place and the mold has been closed, the field may be applied for, for example, 5 seconds. The pressure on the mercury is maintained for the initial 5 second interval and for an additional like interval to produce a part of high quality having an excellent and consistent imprint from the diaphragm.

13 Claims, 9 Drawing Figures

FLOW MOLDING

RELATED APPLICATION

This is a continuation-in-part of application Ser. No. 886,055 filed Mar. 13, 1978 now abandoned, which is, in turn, a continuation-in-part of application Ser. No. 853,127 filed Nov. 21, 1977, now abandoned.

BACKGROUND OF THE INVENTION

The present invention relates in general to a flow molding process and associated apparatus. More particularly, the invention pertains to the flow molding of either two-dimensional or three-dimensional parts or items constructed of plastic or the like material. The techniques of this invention may be used in constructing parts for use in many different fields such as in the automotive industry in, for example, the manufacture of decorative interior plastic parts.

The conventional molding technique for plastic parts involves a heating of the mold cavity in combination with a closing of the mold cavity to compress the plastic into the desired configuration. The known techniques, such as shown in FIG. 1 of this application as discussed in more detail hereinafter, are adequate in constructing some parts or items, however, these techniques are generally only useful in constructing substantially planar pieces hereinafter termed two-dimensional pieces. By two-dimensional pieces, we are not referring to pieces that have no third dimension but are referring to pieces that either have a very small third dimension or pieces that depart in their construction, only a slight amount from a planar configuration. In the molding of three-dimensional pieces, and especially those requiring an accurate imprinting, these traditional techniques are not adequate, as it has been found that the plastic tends to burn in some areas and yet remain cold and thus not flow in other areas. This occurs because the heat gradient is not uniform at the plastic surface at all points therealong. A plastic piece such as shown in the illustration of FIG. 3 is considered as a three-dimensional part and the usual prior art technique in constructing this part is to convert a two-dimensional part into the three-dimensional part by reheating and stretching and bending the part over a mandrel. However, this technique results in a loss of distortion of the grain or pattern of the part and, in addition, internal stresses are produced which may cause material fatigue and a loss of shape of the item.

In some prior techniques, where the plastic is compressed by means of the interacting motion between the mold halves, their tends to be created an unequal pressure gradient on the plastic when constructing three-dimensional parts such as shown in the illustration of FIG. 3, discussed hereinafter. One purpose of the present invention is to provide an improved process overcoming this problem.

Pertinent prior art is found in the related applications referred to herein including such patents as the U.S. Pat. to Brown, No. 2,388,824. Although this patent teaches the use of parallel electrodes, the plastic piece that is being formed is generally of two-dimensional type, as defined herein and not of three-dimensional type. As indicated previously, in molding three-dimensional pieces, such traditional techniques are not adequate primarily because of the uneven temperature gradient that is created.

In view of these prior art disadvantages, it is an object of the present invention to provide an improved flow molding technique, particularly useful for molding three-dimensional parts wherein a uniform temperature gradient may be established across the part to prevent any burning or cold spots in the final part.

Another object of the present invention is to provide an improved flow molding technique particularly useful for molding three-dimensional parts and wherein the plastic has applied thereto, substantially equal pressure along all surfaces thereof assuring a good imprint from the mold along with the application of an equal temperature gradient throughout the plastic material which assures an even flow of the material.

Another object of the present invention is to provide a flow molding process and associated apparatus wherein the molds are of simple and inexpensive construction especially in comparison to injection molding apparatus.

A further object of the present invention is to provide a flow molding technique employing a high radio frequency field for heating primarily the plastic within the mold and which is characterized by a reduced cool down time and a reduced amount of energy consumption.

SUMMARY OF THE INVENTION

To accomplish the foregoing and other objects of this invention there is provided a flow molding apparatus, preferably for constructing three-dimensional pieces. The apparatus comprises a mold having a cavity therein for receiving a material which may be a plastic in liquid, powder or sheet form possibly backed with cloth or leather and which is to be finally formed into a finished piece. A diaphragm is disposed in the cavity having the plastic material or the like on one side thereof for forming at least one surface of the piece. This diaphragm is preferably made from a master having the desired imprint along one surface thereof. In a version of the invention wherein it is desired to provide both a uniform temperature gradient and a uniform pressure, the apparatus also comprises a compressible fluid means which is preferably a liquid conductor such as mercury. This fluid means is disposed in the cavity for compressing the other side of the diaphragm. A fluid pressurizing or compressing means is used such as a piston arrangement to apply pressure to the liquid conductor. Finally, means are provided for establishing an electromagnetic heating field across the mold.

With the above described apparatus the proper temperature and pressure gradients are established at the surface of the plastic material. The contact line between the liquid conductor and the diaphragm preferably has the same contour as the imprinted surface of the diaphragm and this contact line has the same potential therealong. Similarly, the contact line between the top electrode (mold half) and the plastic material matches the contour of the plastic material to also provide the same potential therealong. Thus, as will be evident in the disclosed embodiment discussed in detail hereinafter, the current (ampere) field lines are perpendicular to the plastic surface at all points thus providing a uniform temperature throughout the plastic. Furthermore, with the use of a compressible fluid means on one side of the diaphragm equal pressure is applied to the diaphragm which is preferably a silicone rubber diaphragm which in turn applies even pressure to the plastic surface at all points allowing a perfect imprint in the plastic.

As mentioned above, the preferred technique of this invention provides for both uniform compression and a uniform temperature gradient. However, in the manufacture of some parts, and in particular those that do not depart greatly from being planar, of two-dimensional shape, such as shown in FIG. 2, the compression is provided by the closing of the mold halves in combination with the application of a uniform temperature gradient which is possible by providing matching surfaces of the diaphragm wherein the diaphragm has a constant and uniform thickness all along the plastic parts so that the temperature lines are substantially perpendicular to the plastic part at all points therealong thus providing the uniform temperature gradient.

BRIEF DESCRIPTION OF THE DRAWINGS

Numerous other objects, features and advantages of the invention should become apparent upon a reading of the following detailed description taken in conjunction with the accompanying drawings, in which.

DETAILED DESCRIPTION

Figure 1:
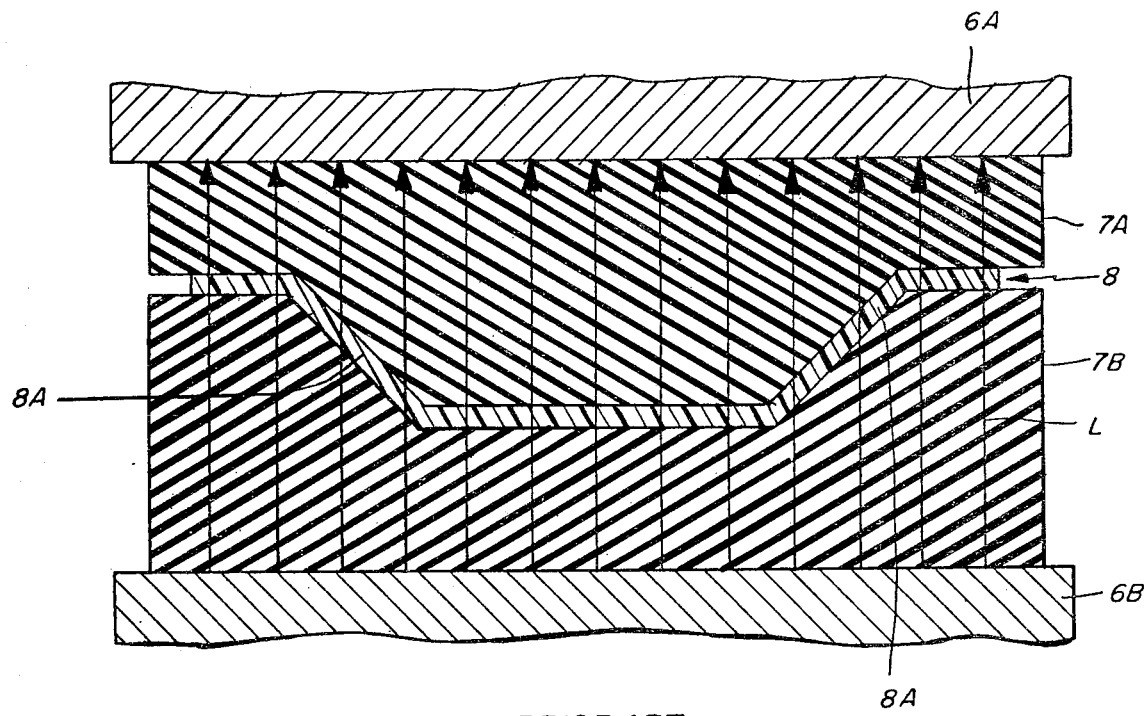
FIG. 1 is a schematic prior art view of the known molding technique.

FIG. 1 is a prior art schematic diagram depicting the mold halves 6A and 6B which carry respectively the silicone rubber diaphragm 7A and 7B defining a mold cavity for the plastic part 8. The entire mold construction is not shown in FIG. 1 because the diagram of FIG. 1 is merely schematic. It is noted in FIG. 1 that the mold halves or electrodes 6A and 6B establish a field across the dielectric material of diaphragms 7A and 7B. The field lines L provide uniform heating only along the horizontal portions of the plastic part 8. Along the two slanted portions of part 8 there is a tendency for the field to overheat the plastic and cause burning spots in those areas. Also, the compression is provided by closing the electrodes 6A and 6B and thus there is also a non-uniform pressure gradient in particular along the slanted portions 8A of the plastic part 8.

in FIG. 1 it is also noted that the diaphragm 7A and 7B have a non-uniform thickness thereby causing the lines L to all run vertically as depicted in FIG. 1.

Figure 6:
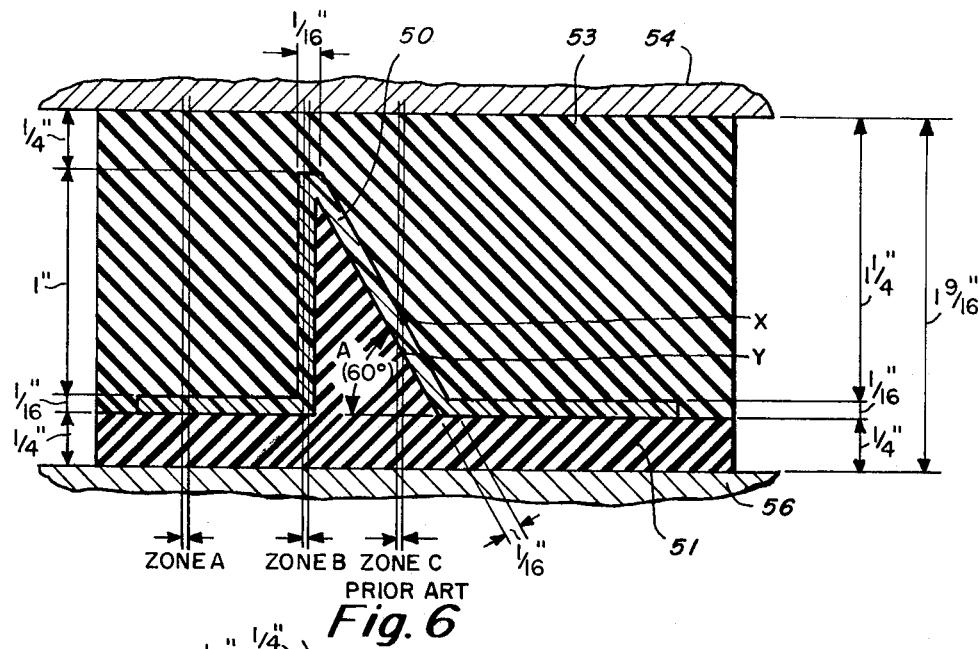
FIG. 6 is a prior art diagram analogous to the one shown in FIG. 1 and used in a detailed analysis of temperature gradient.
Figure 7:
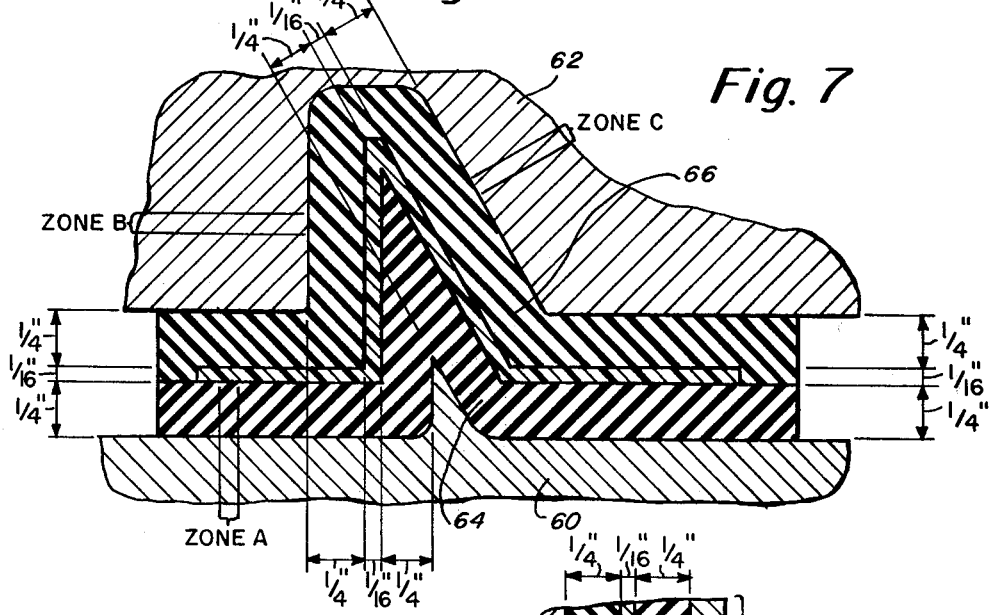
FIG. 7 depicts a configuration of the part similar to that shown in FIG. 6 but employing the technique of the present invention such as analogously exemplified in FIG. 2.

Hereinafter, with regard to FIGS. 6 and 7 there is a more detailed analysis of the heating parameters. In FIGS. 6 and 7 comparisons are made based upon the same part being fabricated by both a prior art technique and the technique of this invention.

Figure 2:
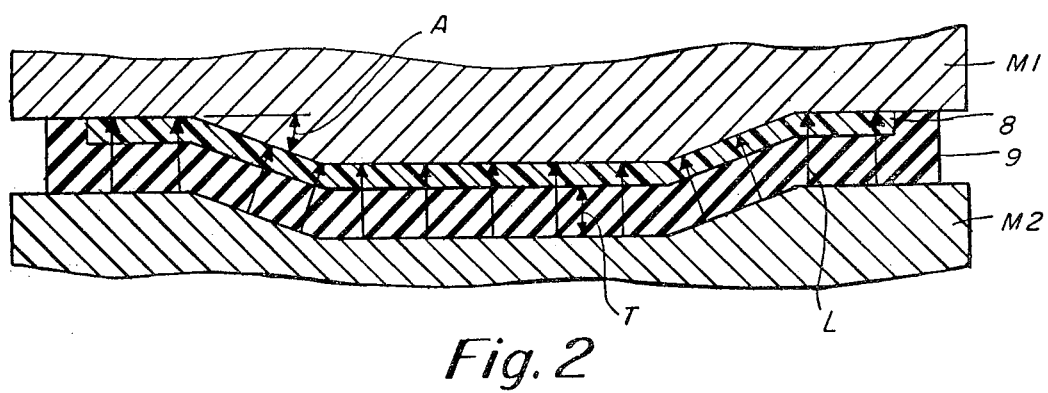
FIG. 2 is a schematic diagram of a mold construction in accordance with the present invention.

FIG. 2 is a schematic diagram of one of the simple versions of the present invention providing a uniform temperature gradient along the entire plastic part 8. In FIG. 2 the construction comprises mold halves M1 and M2. In this arrangement two diaphragms could be used. However, only one diaphragm 9 is illustrated in FIG. 2 carried by the bottom mold half or electrode M2. The top mold half M1 has a surface facing the plastic part 8 that is to match the desired configuration of the part 8. Thus, the mold half M1 itself forms one surface of the mold cavity.

The diaphragm 9 shown in FIG. 2 has a uniform thickness T along the length of the plastic part 8. Thus, the energy heating lines L are not all vertical but instead are all substantially perpendicular to the surface of the plastic material that is to be formed. In this way an even temperature gradient is established all along the plastic part.

Figure 3:
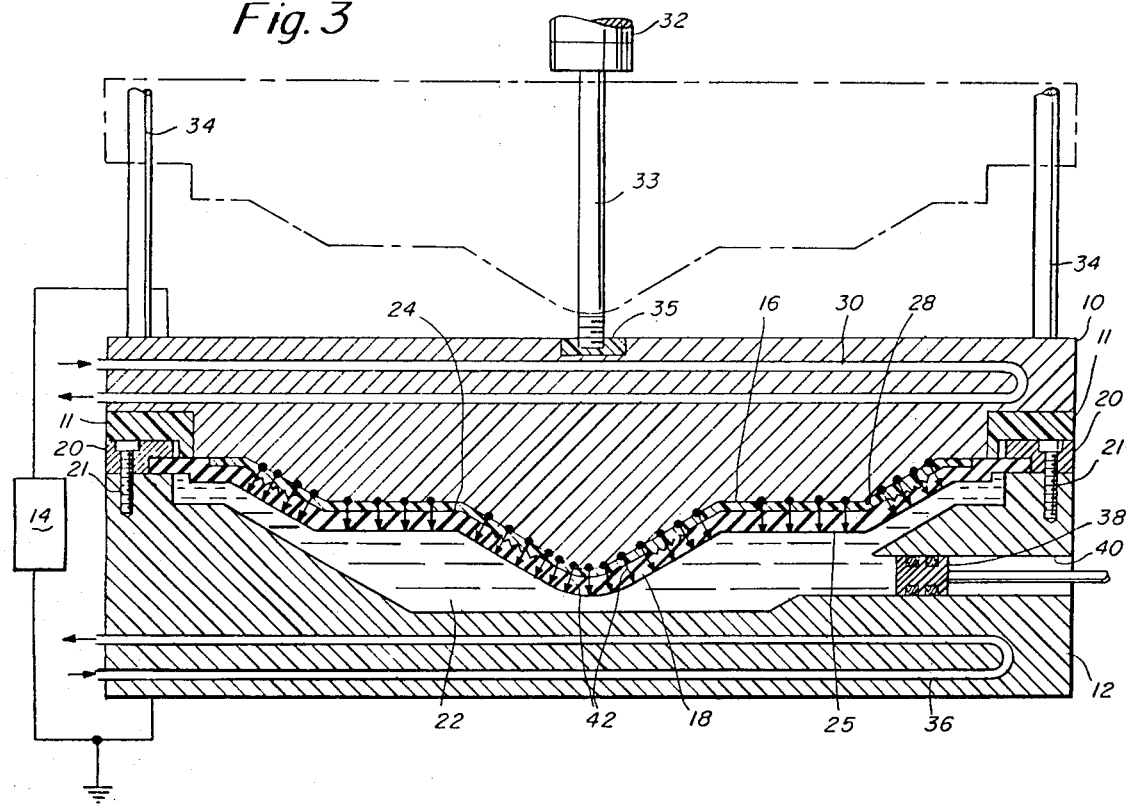
FIG. 3 is a cross-sectional view taken through an apparatus of the present invention showing the mold in its clamped closed position with the further inclusion of a compressible fluid for providing uniform pressure at the part.
Figure 4:
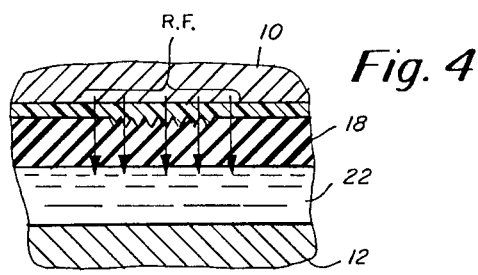
FIG. 4 is an enlarged cross-sectional view of a segment of the structure shown in FIG. 3.
Figure 5:
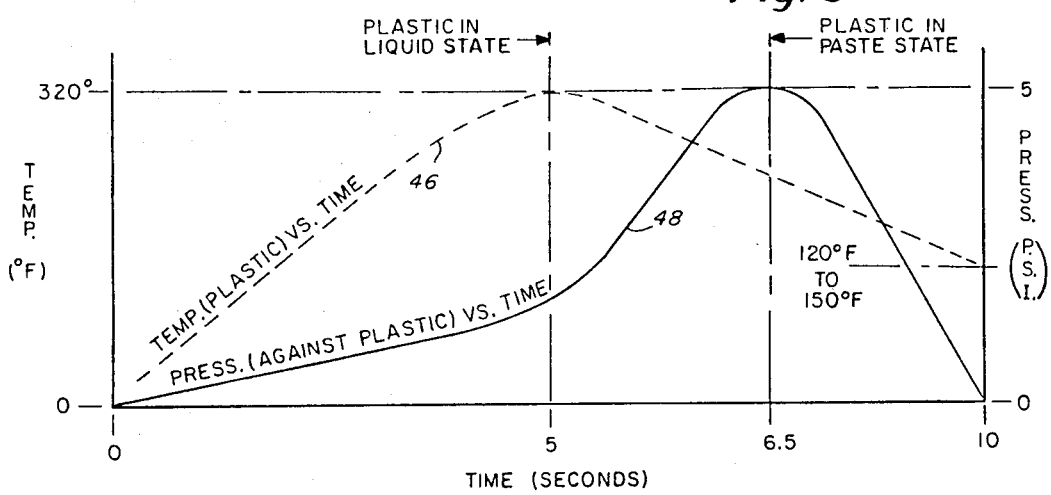
FIG. 5 is a pressure-temperature diagram associated with the method and apparatus of this invention.

The technique of FIG. 2 may be used in constructing plastic parts that depart only slightly from a planar configuration. For example, in constructing the part shown in FIG. 1 it would be preferred to use a method as discussed hereinafter with reference to FIG. 3. However, with the technique of FIG. 2, parts can be constructed wherein any angle of deviation such as the angle A shown in FIG. 2 is in the range of 0°–20°. For angles greater than 20°, the technique of FIG. 3 is preferred. Also, where the surface requires a good imprint from the mold, it is also desired to use the technique of FIG. 3. However, if the plastic of which the piece is to be formed is provided in a liquid state then the technique of FIG. 2 can be used even for parts having a substantial planar deviation including angles of 20° or greater.

In FIG. 3 there are shown mold halves 10 and 12 which are also referred to, respectively, as top and bottom electrodes. An electromagnetic energy source 14 is shown coupling to these electrodes for establishing a potential difference therebetween. Between the electrodes there is formed a cavity 16 in which is disposed the rubber diaphragm 18 secured at either end by insulating clamps 20. The bottom electrode 12 is constructed with a reservoir for receiving a compressible, preferably conductive, liquid shown in FIG. 1 as mercury 22.

The rubber diaphragm 18 has an imprinted surface 24 and may be constructed of a silicone rubber material. The diaphragm may be made from a master using any one of a number of different known techniques. The master, of course, corresponds in shape and contour to the plastic part that is going to be fabricated with the apparatus of FIG. 1. Also, the top electrode has its surface 28 machined or cast to fit the inside (non-grain) surface of the master. Both of the electrodes 10 and 12 may be constructed of an aluminum material. The top electrode has passages 30 for permitting the passage of a coolant such as water or freon. An actuating cylinder 32 connects by rod 33 to the top electrode 10 enabling this electrode to separate from the bottom electrode to either load the plastic material or remove the cured plastic from the mold. FIG. 1 also shows a pair of guides 34 that are used for properly aligning the two electrodes.

The material that is to be formed by the process of this invention may be in a liquid powder or sheet form and may be draped in the cavity 16 (with or without the application of vacuum) or injected into the cavity 16 from outside of the mold with the use of one or more passages through the mold but not shown in FIG. 1. If sheets of plastic are used the sheets may be rigid or flexible and may be backed with another material such as cloth or leather.

The bottom electrode 12 is also provided with a cooling passage 36. In addition, this electrode is machined with a relatively deep cavity allowing a relatively substantial space for the mercury 22. FIG. 2 shows a piston assembly 38 slideable within passage 40 of the electrode 12 for selectively exerting pressure on the mercury which is in turn uniformly coupled to the surface of the diaphragm 18.

The electrodes and the diaphragm are preferably constructed so that the contour lines or surfaces 28, 16 and 25 essentially match each other in a substantially parallel surface arrangement. Also, the liquid in the reservoir of the bottom electrode is preferably conductive so as to establish current lines 42 which are substantially perpendicular to the plastic part at all points therealong as clearly depicted in FIG. 1. In other words, the same potential exists at the surface 28 all therealong and also uniform but different potential exists all along the surface 25 of the diaphragm. Because of this current line distribution there will be uniform heating all along the plastic piece providing an extremely uniform flow therealong. In addition, the diaphragm 18 is somewhat flexible and with the use of a compressible liquid which is compressible by piston assembly 38, it is possible to provide a totally uniform pressure on the surface 25 of the diaphragm; which pressure is conveyed to the plastic part to provide an excellent imprint in the plastic part as it is desired. In accordance with the process of the present invention the mold may be operated by means of the cylinder 32 to either separate the mold or clamp the mold together. FIG. 1 shows the mold in a clamped and closed position wherein the diaphragm 18 has been secured at its end by clamps 20. The mold halves or electrodes 10 and 12 are also appropriately secured together in any well known manner. Prior to closing the mold, the plastic is introduced into the cavity 16 either in liquid, powder or sheet form. When the mold is closed the mercury is already in place in the position shown in FIG. 1 but the piston assembly 38 is withdrawn sufficiently so that there is little or no pressure exerted on the diaphragm by the mercury at an initial stage of the process.

When the mold is securely closed, the source 14 is selectively operated to apply electromagnetic energy across the electrodes causing a uniform heating through the plastic material. In this connection reference is now made to the graphs of FIG. 3 which show two waveforms including a waveform 46 of temperature versus time and a waveform 48 of pressure versus time. The temperature that is recorded may be the temperature of the plastic material sensed by a thermocouple not shown in the drawings. The pressure is the pressure measured in the cavity.

In accordance with one process, the heat that is generated from the electromagnetic field is applied for a period of 5 seconds with the plastic material in the mold thereby being in a liquid state by virtue of this applied heat. The pressure exerted by the assembly 38 is maintained for this 5 second interval and also for an additional 5 second interval. The pressure exerted by the assembly 38 is maintained for this 5 second interval and also for an additional 5 second interval. The pressure exerted by the piston assembly 38 is controlled by a relatively low, gradually-increasing pressure during the first 5 second interval as depicted in FIG. 3 with the pressure thereafter increasing and peaking, for example, at the 6.5 second time point. The pressure exerted by assembly 38 follows a curve substantially the same as the curve 48 shown in FIG. 3.

The silicone rubber diaphragm 18 may have a thickness on the order of $\frac{1}{4}$ to $\frac{3}{8}$ of an inch. Because this diaphragm is quite flexible, the pressure in the cavity quite closely follows the pressure waveform imposed by the piston assembly 38.

It has been found that the use of a liquid form of plastic is preferred. One such product that has been used is Plastisol.

Although mercury has been disclosed as one type of liquid conductor that is used with the invention, it is understood that other liquids including liquids in paste form may be used in place of the mercury. In fact, it may be more advantageous to use a sodium or graphite solution because mercury vapors are poisonous. Even though the mold is closed the Silicone rubber diaphragm is somewhat more porous and there is a possibility that the mercury vapors may escape from the mold. Another liquid conductor that may be used is a fusible alloy which is maintainable in a liquid state at about 120° F. The liquid may be an alloy of bismuth, lead, tin, or cadmium.

When fusible alloys are used instead of the liquid mercury it is preferred that the mold be maintained, as previously indicated, at a temperature on the order of 120° F. Thus, the water that is passed through the passages 36 may be maintained at a temperature of, for example, 150° F. This water is still sufficient to cool the plastic. The top mold may be maintained at ambient temperature.

As viewed from the top, the mold may have a square or rectangular shape with the clamp 20 extending about the perimeter of the mold. The clamp 20 firmly fastens the rubber diaphragm into the bottom mold half 12 by means of the screws 21 shown in FIG. 1. FIG. 1 also shows the rod 33 which couples from the cylinder 32 being electrically insulated by member 35. This insulation member is necessary if the rod 33 is grounded to the frame of the machine in any way. Because a potential is being applied to the mold half 10 it is of course, necessary to isolate any grounded members such as even the guides 34.

The cylinder 32 and its associated rod 33 provide for the opening and closing of the mold and also function as a clamping means after the mold is closed. The cylinder 32 has a bore size that is large enough with the air pressure that is applied to create a downward force greater than the force created by the pressure of the fluid conductor on the diaphragm. To limit the downward position of the top mold half 10 there is provided a stop member 11 which is an electrical insulator that is preferably secured to the mold half 10. The stop member 11 limits the motion between the mold halves. The member 11 is constructed of an insulator material because there is a voltage applied to the mold half 10 and its potential must be insulated from all grounded points. The cylinder 32 may also have associated therewith a toggle mechanism for maintaining it in its locked or clamped position.

The method apparatus of FIG. 3 is also particularly useful in constructing plastic parts having one or more reverse curves. In the past, these parts could not be readily constructed with a molding process because of the difficulty of separating the mold after the part is manufactured. However, with the technique of FIG. 3 after the part has been constructed, a vacuum reverse pressure can be applied to cause a slight opening of the rubber diaphragm thereby permitting easy separation between the mold halves.

FIG. 6 shows what has been termed herein, a three-dimensional piece 50 which is formed by mold diaphragms 51 and 53. FIG. 6 also shows the top electrode 54 and bottom electrode 56. In FIG. 6 the plastic part is essentially constructed in four linear segments. In FIG. 6 there are defined three separate zones identified as zone A, B and C. The plastic part that is being fabricated is considered as having the same thickness throughout its length. This thickness may be 1/16". FIG. 6 also shows other pertinent dimensions on the diagram. The angle A is 60°.

For a given RF voltage U between the two flat electrodes, 54, 56 of, for example, 4000 volts at a frequency of 40 MHz it is the purpose of this analysis to determine the heat that is provided to the plastic part in these three different zones identified in FIG. 6 as zones A, B and C.

With regard to zone A between the top and bottom electrodes there is an effective mold material thickness of $1\frac{1}{2}$" with the plastic having a thickness of 1/16". In zone B the ratio of the plastic to the mold material is almost reversed with the mold material being a total of $\frac{1}{2}$" while the plastic has a thickness of 1 1/16".

With regard to zone C the 60° angle was chosen for simplicity. At an angle of 60° the distance between the points X and Y can be shown to be $\frac{1}{8}$" or twice the 1/16" thickness of the plastic part. Accordingly, the mold material has a corresponding thickness of 1 7/16". Thus, it can be clearly seen that in each of the three separate zones there are different ratios between the molding material represented by areas 51 and 53 and the plastic part 50.

For the molding material a preferred product is silicone rubber RTV-14 made by, for example, General Electric. At 40 MHz the dielectric constant $\epsilon r_{RTV}=3.6$ and the power factor P.F.$_{RTV}=0.01$. For the plastic part we have used plastisol EV-30 (P.V.C.) such as manufactured by Industrial Solvents. The dielectric constant of that material is $\epsilon r_{PVC}=4.95$ and the power factor P.V.$_{PVC}=0.09$.

The capacitance between two parallel electrodes C is given by the following formula:

$$C = \frac{\epsilon r \times A \times 25.4}{36 \times \pi \times d} \quad (1)$$

where
C=capacitance in pico farads,
A=area in inches
$\epsilon r$=dielectric constant
d—distance between two electrodes in inches.
Equation (1) can be rewritten as follows:

$$\frac{Cpf}{inch^2} = \frac{\epsilon r \times 25.4}{36 \times \pi \times d} \quad (1A)$$

The equivalent capacitance Ce of two capacitors in series is given by the following equation:

$$Ce = \frac{C_1 \times C_2}{C_1 + C_2} \quad (2)$$

The reactance associated with these capacitances is given by the following formula:

$$X_c = \frac{1}{2\pi F C} \quad (3)$$

where
$X_c$=reactance in ohms,
F=frequency in cycles per second and
C=capacitance in farads.

The resistance R is equal to the product of the power factor and the reactance. Therefore, by substituting the value of the reactance into equation (3) the following formula is obtained:

$$R = \frac{P.F.}{2\pi F C} \quad (4)$$

The equivalent resistance $R_e$ of two resistors R1 and R2 in series is given by the following formula:
$$R_e = R_1 + R_2 \quad (5)$$

The current I passing between the two electrodes may be represented by the following formula:

$$I = \frac{U}{\sqrt{X_c^2 + R^2}} \quad (6)$$

where
I=amperes,
U=voltage in volts between the electrodes,
$X_c$=reactance in ohms,
R=resistance in ohms.

The heat provided may be represented by the following equation:

$$P = R \times I^2 \quad (7)$$

where p is in watts.

An analysis is now made of the power that is dissipated in the plastic parts in each of the three zones that have been established for the purpose of example. Hereinafter in table 1 there is shown a summary with regard to many of the different parameters in each of these zones.

In zone A the capacitances for the two separate materials may be represented as follows:

$$\frac{C_{RTV}}{inch^2} = 0.539 \; P.F. \text{ and}$$

$$\frac{C_{PVC}}{inch^2} = 17.787 \; P.F.$$

These capacitances have been derived from equation (1). From equation (2) the equivalent capacitance can be calculated as 0.523 P.F. Also, from equation (1) an equivalent dielectric constant can also be arrived and has been calculated as 3.639. From equation (4) the resistance can be determined as follows:

$$\frac{R_{RTV}}{inch^2} = 73.82 \text{ ohms and also}$$

-continued $$\frac{R_{PVC}}{inch^2} = 20.13 \text{ ohms.}$$

From equation (5) the equivalent resistance is therefore $$Re = 93.95 \text{ ohms.}$$

Employing equation (3) one can calculate the reactance $X_C$ as being 7,607.8 ohms. From equation (6) the current may be calculated as being 0.5257 amps. This being the current, the current $I^2 = 0.2764$. From equation (7) one can then calculate the power in the plastic material as being 4.92 watts per square inch. From FIG. 6 it is seen that this power is applied to the 1/16" thickness of PVC.

In zone B the same calculations can be followed as followed previously with regard to zone A. Thus, the following parameters can be derived:

$$\frac{C_{RTV}}{inch^2} = 1.617 \text{ P.F.}$$

$$\frac{C_{PVC}}{inch^2} = 1.046 \text{ P.F.}$$

$$C_e = .635 \text{ P.F.}$$

$$\frac{R_{RTV}}{inch^2} = 24.61 \text{ ohm}$$

$$\frac{R_{PVC}}{inch^2} = 342.35 \text{ ohm}$$

$$\frac{R_e}{inch^2} = 366.96 \text{ ohm}$$

$$X_c = 6,265.9 \text{ ohm,}$$

$$I = .637 \text{ amps}$$

$$I^2 = .40613 \text{ amps, and thus}$$

$$\frac{P_{PVC}}{inch^2} = 139 \text{ watts per inch squared.}$$

It can been seen from the power derivation in zone B that the power dissipated is orders of magnitude larger than the power dissipated in zone A.

Zone C is calculated next. The same formulas are applied as in the calculations in zones A and B. Thus, in zone C the following parameters have been defined:

$$\frac{C_{RTV}}{inch^2} = .562 \text{ pF}$$

$$\frac{C_{PVC}}{inch^2} = 8.894 \text{ pF}$$

$$C_e = .5286 \text{ pF}$$

$$\frac{R_{RTV}}{inch^2} = 70.8 \text{ ohms}$$

$$\frac{R_{PVC}}{inch^2} = 40.26 \text{ ohms}$$

$$R_e = 111.06 \text{ ohms}$$

$$X_c = 7,527.2 \text{ ohms}$$

$$I = .5314 \text{ amp}$$

$$I^2 = .28233 \text{ amp and therefore}$$

$$\frac{P_{PVC}}{inch^2} = 11.37 \text{ watts per square inch.}$$

It can be seen that the calculation in zone C is by far more comparable to that calculated in zone A in comparison to the calculation in zone B. Please make reference to table 1.

The derivations for power taken from table 1, namely 4.92 watts in zone A, 139 watts in zone B and 11.37 watts in zone C represent the heat received by the plastic part to be cured in these different zones. This in a sense is a total power to compare the temperatures to which the part has been raised by this RF heating and one has to consider the heat that is received on the basis of the same volume of plastic that is being heated. A good choice is a 1/16" thickness of the plastic. Because in

TABLE 1

|  |  | P.F. power factor | $\epsilon_r$ dielectric | CPF inch$^2$ | R in ohms inch$^2$ at 40 MHz | I in amps inch$^2$ | $X_c$ | P watts/ inch$^2$ | $P_{PVC}$ per inch$^2$ thickness |
|---|---|---|---|---|---|---|---|---|---|
| | 1½" RTV-14 | .01 | 3.6 | .539 | 73.82 | .526 | | | |
| | 1/16" P.V.C. | | | | | | | | |
| ZONE A | EV-30 | .09 | 4.95 | 17.787 | 20.13 | .526 | | 4.92 | 4.92 |
| | Combination A | | | .523 | 93.95 | .526 | 7,607.8 | | |
| | ⅞" RTV-14 | .01 | 3.6 | 1.617 | 24.61 | .637 | | | |
| | 1-1/16" PVC | | | | | | | | |
| ZONE B | EV-30 | .09 | 4.95 | 1.046 | 342.35 | .637 | | 139 | 8.18 |
| | Combination B | | | .635 | 366.96 | .637 | 6,265.9 | | |
| | 1-7/16" RTV-14 | .01 | 3.6 | .562 | 70.8 | .5314 | | | |
| ZONE C | ⅛" PVC EV-30 | .09 | 4.95 | 8.894 | 40.26 | .5314 | | 11.37 | 5.69 |
| | Combination C | | | .5286 | 111.06 | .5314 | 7,527.2 | | |

TABLE 2

|  |  | P.F. power factor | $\epsilon_r$ dielectric | CPF inch$^2$ | R in ohms inch$^2$ at 40 MHz | I in amps inch$^2$ | $X_c$ | P watts/ inch$^2$ | $P_{PVC}$ per inch$^2$ thickness |
|---|---|---|---|---|---|---|---|---|---|
| | ⅞" RTV-14 | .01 | 3.6 | 1.617 | 24.6 | 1.49 | | | |
| ZONE A | 1/16" EV-30 PVC | .09 | 4.95 | 17.787 | 20.13 | 1.49 | | 44.67 | 44.67 |
| | Combination A | | | 1.482 | 44.74 | 1.49 | 2,684.8 | | |

TABLE 2-continued

| | P.F. power factor | $\varepsilon_r$ dielectric | CPF inch$^2$ | R in ohms inch$^2$ at 40 MHz | I in amps inch$^2$ | $X_c$ | P watts/ inch$^2$ | $P_{PVC}$ per inch$^2$ thickness |
|---|---|---|---|---|---|---|---|---|
| Combination B | | | 1.482 | 44.74 | 1.49 | 2,684.8 | 44.67 | 44.67 |
| Combination C | | | 1.482 | 44.74 | 1.49 | 2,684.8 | 44.67 | 44.67 |

Zone A the original calculation was made on that basis then the normalized power is the same or 4.92 watts per square inch. For zone B because the thickness of the plastic is substantial, namely 1 1/6" thick, then for a 1/16" thick piece of plastic the heat received is calculated as 8.18 watts per square inch. Similarly, for zone C the calculation can be made as 5.69 watts per square inch.

The silicon rubber molding material is also caused to be heated at the same time that the plastic part is heated, and is heated throughout its thickness by the RF field. This heating is at a lower temperature than the plastic due to its lower power factor. In each zone the current that passes through the plastic is the same as the current that passes through the silicone rubber. The ratio of the temperatures between the plastic and the silicone rubber will be the same in each of these three different zones as will be the loss of heat by conduction from the plastic to the silicone rubber. Because the heating cycle is quite short, one can essentially ignore the comparison between the different temperatures in the three zones. There is not much heat that is removed from the plastic until it reaches its peak temperature at the end of the heating cycle.

In going through the following analysis comparing powers that were calculated in table 1 with temperatures in each of the zones, we can choose the initial temperature of the plastic as being 70° F. The recommended curing temperature for the plastic (EV-30) is 370° F. At 410° F. the plastic starts to burn and under 340° F. it does not cure properly.

The following equation represents the temperature of the PVC in each of these zones:

$$P \times t = k \times m \times \Delta T \quad (8)$$

where
P = power (see last column of table 1)
t = time in seconds
k = specific heat of EV-30 = 0.45 BTU/°F. × lbs
m = mass of 1/16"$^3$ of EV-30
$\Delta T$ = increase in temperature of EV-30.

In equation (8) the majority of the terms are constant. The time, specific heat and mass are the same in each of the three zones and can be represented by a constant. Therefore, equation (8) can be rewritten as follows:

$$\Delta T_B = \Delta T_A \frac{P_B}{P_A} \quad (9)$$

One can choose the cycle time to obtain $\Delta T_A = 300°$ F. Thus, in zone A the term $T_A = 370°$ F. For zone B the term $T_B$ can also be calculated as $$300 \times \frac{8.18}{4.92} + 70° \text{ F.} = 568.8° \text{ F.}$$

Similarly, in zone C the quantity of $T_{CC}$ can be calculated as $$300 \times \frac{5.69}{4.92} + 70° \text{ F.} = 417° \text{ F.}$$

From the above calculations for the quantities $T_A$, $T_B$ and $T_C$ some interesting observations can be made. When the curing cycle is controlled so that the zone A temperature is 370° F., which is a desired temperature, then the temperature in zone B will cause a burning and carbonizing of the plastic in this zone. Zone C is also substantially above the desired temperature range and there will be an initiation of burning of the plastic in zone C also. If, on the other hand the cycle time is shortened so as to not burn in particular zone B, then the temperatures in the other two zones are far too low to cause any curing of the plastic. For example, if the zone B temperature is maintained at 400° F. then the zone A temperature will be 198° F. which is not at all acceptable.

Figure 9:
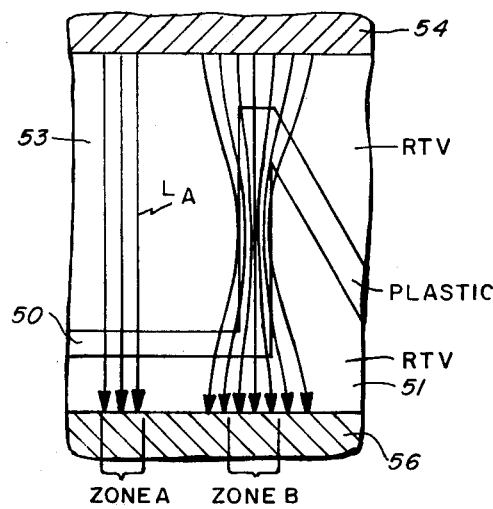
FIG. 9 is a somewhat enlarged view of previous FIG. 6 showing the theory of the invention.

FIG. 9 is a somewhat enlarged view of a fragment of the part shown in FIG. 6. It has been found that the differences in the temperature of the plastic in the three different zones may be even greater than what can be calculated from the foregoing analysis. Referring to FIG. 9, in zone A the current lines $L_A$ are all parallel and the current is in reality the same as the theoretical current that was calculated. The heat that will be generated is also what would be calculated. However, in zone B as noted by the current lines, there is a concentration of current into the plastic. The current directed from electrode to the other will take the easiest path or what might be termed the lowest path of resistance. This means that the current in zone B is in actuality greater than the theoretical value that one calculates so that the heat generated and the increase in temperature of plastic in that zone is also greater than the calculated value. On the basis of calculations previously made with regard to equation (9) when the temperature in zone A is say 370° F. then the temperature in zone B is greater than 569° F. It is difficult to make an exact calculation but it is easily determined that it is virtually impossible to make an effective part of the type shown in FIG. 9 with the prior art methods of RF heating.

FIG. 7 shows basically the same configuration of the plastic part, however, employing the concepts of the present invention rather than the prior art arrangement shown in FIG. 6. In FIG. 7 it is noted that the electrodes such as the bottom electrode and the top electrode 62 substantially match the configuration of the plastic part that is being fabricated. FIG. 7 also shows the mold material 64 and 66 on opposite sides of the plastic part. In FIG. 7 there have again been defined three zones A, B and C which are defined somewhat different than the zones in FIG. 6.

In the illustration of the present invention depicted in FIG. 7 the same material will be used as used in FIG. 6. These materials include the silicone rubber RTV-14 and the plastisol EV-30 (PVC). The heat generated in each of the zones will now be calculated. In this connection reference is also made to table 2 which shows calculated values.

In zone A the following capacitances can be calculated from equation (1) to show that:

$$\frac{C_{RTV}}{inch^2} = 1.617 \text{ pF}$$

$$\frac{C_{PVC}}{inch^2} = 17.787 \text{ pF}$$

From equation (2) the equivalent capacitance $$\frac{C_e}{inch^2} = 1.482 \text{ pF.}$$

From equation (4)

$$\frac{R_{RTV}}{inch^2} = 24.61 \text{ ohms}$$

$$\frac{R_{PVC}}{inch^2} = 20.13 \text{ ohms}$$

From equation (5) the equivalent resistance is $$\frac{R_e}{inch^2} = 44.74 \text{ ohms.}$$

Equation (3) indicates that:
$X_c$ for the combination is 2,684.8 ohms.
From equation (6) one can calculate:

$$\frac{I_A}{inch^2} = 1.49 \text{ amps}$$

Therefore,
$I_A{}^2 = 2.219$ amps.
From equation (7) the power can then be calculated as follows:

$$\frac{P_{A\ PVC}}{inch^2} = 44.67 \text{ watts per in. squared.}$$

This is the heat that is provided to a 1/16" thick plastic part. It is noted that the values previously calculated are shown in table 2 with reference to zone A.

In zones B and C it can be readily seen that there are provided the same thicknesses of plastic and mold material. Thus, the calculations previously made for zone A also apply identically for zones B and C. Again, this is shown in table 2 by the identical values shown in each of the vertical columns and in particular those relating to the power calculated. One can thus deduce that in the three different zones A, B and C the plastic is heated identically. The temperature of the plastic in each of these zones will be the same at all times, or in other words, $T_A = 370°$ F., $T_B = 370°$ F. and $T_C = 370°$ F.

Some interesting comparisons can be made between the powers calculated with reference to tables 1 and 2. It is noted that the heat generated in accordance with the table 2 calculations in accordance with the invention is greater than the heat that is generated from the prior art arrangement. Therefore, the cycle time can be reduced significantly making the process of the present invention, not only a better process, but a quicker process.

In accordance with the table 2 calculations it has been stated that the quantity $T_A = 370°$ F. We also mentioned previously that this corresponded with an initial temperature of 70° F. With the prior art arrangement the change in temperature from equation (8) can be calculated as $$300 \times \frac{4.92}{44.67} = 33° \text{ F.}$$

Accordingly, for the prior art case the quantity $T_A = 103°$ F. Thus, it can be seen that a much faster cycle time can be accomplished with the process of this invention.

Finally, one may examine the interface between two zones such as zones A and B. In order to do this, reference is made to FIG. 8 which shows a zone B which occurs between two perpendicular straight sections. In this example, the thickness of the plastic part is also 1/16" in order to make a comparison with previous calculations.

Figure 8:
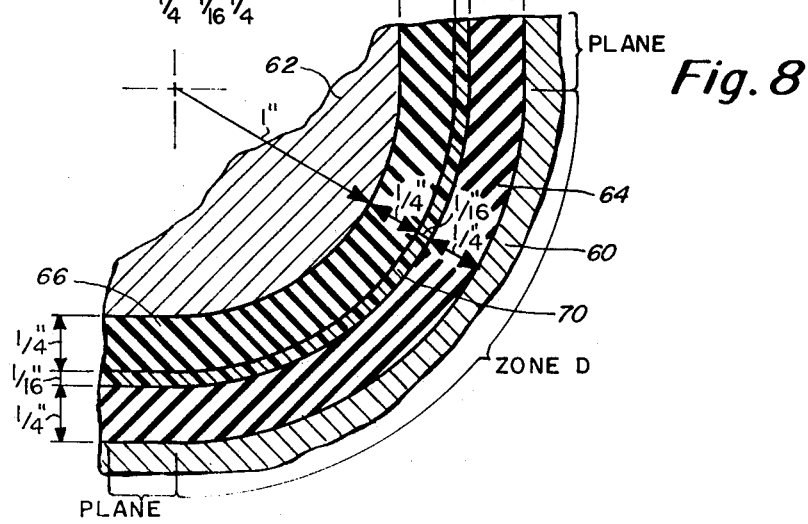
FIG. 8 is a further illustration of the heat gradient at a radius bend.

In FIG. 8 similar reference characters are used as previously designated in FIG. 7. In FIG. 8 the following parameters are shown:

$R_1$ = radius of first electrode = 1"
$R_2$ = radius of inside of plastic part = $1\frac{1}{4}$"
$R_3$ = radius of outside of plastic part = 1 5/16"
$R_4$ = radius of second electrode = 1 9/16".

To calculate the capacitance in zone D at the bend, one can use the general formula of a coaxial cable given as follows:

$$C = \frac{.2171\ \epsilon r \times 1}{9 \times 10^5 \log \frac{R'}{R}} uF \qquad (10)$$

In equation (10) L is the length in centimeters and R' and R are the respective radii of the two coaxial cables.

To compare the results with the calculations made previously, one has to consider an area of one square inch of plastic in the bend zone. The value of the length L can be calculated by the following formula;

$$\frac{2\pi R}{1} \times l = 1 \text{ inch}^2$$

By solving for L one can determine L = 1.262 centimeter.

From equation (10) the following formulas can be written:

$$\frac{C_{i\ RTV}}{inch^2} = \frac{.2171 \times 3.6 \times 1.262}{4 \times 9 \times 10^5 \times \log \frac{1.25}{1}} =$$

$$.0000113 uF = \frac{11.3}{4} \text{ pF} = 2.825 \text{pF}$$

$$\frac{C_{PVC}}{inch^2} = \frac{.2171 \times 4.95 \times 1.262}{4 \times 9 \times 10^5 \times \log \frac{1.3125}{1.25}} = \frac{71.1}{4} \text{ pF} = 17.775 \text{pF}$$

$$\frac{C_{o\ RTV}}{inch^2} = \frac{.2171 \times 3.6 \times 1.262}{4 \times 9 \times 10^5 \times \log \frac{1.5625}{1.3125}} =$$

$$\frac{14.47}{4} \text{ pF} = 3.618 \text{ pF.}$$

-continued $$\frac{C_D}{\text{inch}^2} = \frac{C_{iRTV} \times C_{PVC} \times C_{oRTV}}{C_{iRTV} \times C_{PVC} + C_{PVC} \times C_{oRTV} + C_{iRTV} \times C_{oRTV}} = 1.456 \text{pF}$$

From equation (4) resistances can also be calculated as follows:

$$\frac{R_{iRTV}}{\text{inch}^2} = \frac{.01}{2\pi \times 40 \times 10^6 \times 2.825 \times 10^{-12}} = 14.08 \text{ ohms}$$

$$\frac{R_{PVC}}{\text{inch}^2} = \frac{.09}{2\pi \times 40 \times 10^6 \times 17.775 \times 10^{-12}} = 20.15 \text{ ohms}$$

$$\frac{R_{oRTV}}{\text{inch}^2} = \frac{.01}{2\pi \times 40 \times 10^6 \times 3.618 \times 10^{-12}} = 11 \text{ ohms}$$

From equation (5) the resistance for the combination is given by the following formula:

$$\frac{R \text{ combination } D}{\text{inch}^2} = 45.23 \text{ ohm.}$$

Continuing on with the solution, from previous equation (3) one can calculate the quantity:

$$\frac{X_c \text{ combination } D}{\text{inch}^2} = 2,732 \text{ ohms}$$

From equation (6) one can calculate the following quantity:

$$\frac{I_D}{\text{inch}^2} = 1.464 \text{ amps}$$

$$I_D^2 = 2.143 \text{ amps}$$

By the use of equation (7) one can then calculate the power as:

$$\frac{P_D PVC}{\text{inch}^2} = \frac{43.19 \text{ watts}}{\text{inch}^2}$$

Thus, it can be seen that the heat provided in the bend is almost identical to the one that was calculated and shown in Table 2. This previous calculation was 44.67 watts per inch squared, which is very close to the 43.19 watts per inch squared calculated in the bend.

The difference in temperature is also only slight. For the previous example of 370° F. one can calculate the following quantity:

$$T_D = \frac{300 \times 43.19}{44.67} + 70 = 360.1° \text{ F.}$$

Therefore, the difference in the temperature that is attained in a bend in a straight section is quite close with the difference being only on the order of 10° F. This is quite acceptable.

Having described one embodiment of the present invention it should now be apparent to those skilled in the art that numerous other embodiments are contemplated as falling within the scope of this invention which is to be defined by the appended claims.

What is claimed is:

1. Flow molding apparatus comprising;
   means defining an electrically conductive mold having a non-planar cavity therein for receiving a material that is to be finally formed into a non-planar three-dimensional finished piece,
   a diaphragm disposed in the cavity having a material on one side thereof for forming at least one surface of the piece,
   and means for establishing an electromagnetic heating field across the mold,
   said mold comprising a pair of electrode means having facing surfaces that extend in parallel along the length of the cavity so as to establish heat field lines substantially perpendicular to piece at points therealong,
   said facing surfaces of the electrode means and both surfaces of the diaphragm all being congruent.

2. Flow molding apparatus comprising;
   means defining an electrically conductive mold having a non-planar cavity thereon for receiving a material that is to be finally formed into a substantially constant thickness non-planar three-dimensional finished piece,
   a removable resilient diaphragm of a substantially constant thickness disposed in the cavity having an imprinted side facing the cavity and adapted to form at least one surface of the piece,
   said molding comprising a pair of electrodes having the diaphragm carried by one of said electrodes,
   means for applying pressure to the mold to compress the diaphragm against the formable material,
   and means for establishing a heating field across the mold,
   the electrodes of the mold having facing surfaces that extend in parallel along the length of the cavity so as to establish heat field lines substantially perpendicular to the pieces at points therealong.

3. Flow molding apparatus as set forth in claim 2 wherein the capacitance across the electrodes at all points therealong bridging said piece is the same to thus provide a constant heating power along said piece.

4. Flow molding apparatus as set forth in claim 1 wherein the capacitance across the electrodes at all points therealong bridging said piece is the same to thus provide a constant heating power along said piece.

5. Flow molding apparatus as set forth in claim 2 wherein the resistance across the electrodes at all points therealong bridging said piece is the same to thus provide a constant heating power along said piece.

6. Flow molding apparatus as set forth in claim 1 wherein the resistance across the electrodes at all points therealong bridging said piece is the same to thus provide a constant heating power along said piece.

7. Flow molding apparatus as set forth in claim 1 wherein at least one of said electrode means comprises compressible fluid means in the cavity and means for pressurizing the fluid means so as to apply even pressure to the material.

8. Flow molding apparatus as set forth in claim 7 wherein the fluid means comprises a liquid conductor.

9. Flow molding apparatus as set forth in claim 8 wherein said fluid means comprises mercury.

10. Flow molding apparatus as set forth in claim 7 wherein said fluid means extends along substantially the length of the diaphragm.

11. Flow molding apparatus as set forth in claim 1 wherein the diaphragm has a substantially constant thickness along the length that faces said material.

12. Flow molding apparatus for molding of three-dimensional finished pieces of a moldable material employing an electrical field applied to the material, including mold members defining a non-planar cavity and forming electrodes across which the electrical field is applied so as to establish heat field lines substantially perpendicular to the finished piece at points therealong, and at least one resilient diaphragm disposed in the cavity for forming at least one surface of the piece and adapted to the non-planar contour of the finished piece, the mold surfaces of the mold pieces facing one to another adapted to the contour of the finished piece.

13. Flow molding apparatus as set forth in claim 12 wherein the non-planar cavity forms a non-planar piece.

* * * * *